United States Patent
Asano

(10) Patent No.: US 6,702,072 B2
(45) Date of Patent: *Mar. 9, 2004

(54) BRAKE CYLINDER UNIT

(75) Inventor: Yoshio Asano, Kobe (JP)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/124,855

(22) Filed: Apr. 18, 2002

(65) Prior Publication Data

US 2003/0196859 A1 Oct. 23, 2003

(51) Int. Cl.[7] ............................................. F16D 65/24
(52) U.S. Cl. ..................... 188/170; 188/202; 188/216
(58) Field of Search ................................ 188/170, 202, 188/216; 92/130 A, 63

(56) References Cited

U.S. PATENT DOCUMENTS

| | | | | |
|---|---|---|---|---|
| 3,717,072 A | * | 2/1973 | Kaltenthaler et al. | 92/152 |
| 3,895,695 A | * | 7/1975 | Hunter | 188/170 |
| 4,036,111 A | * | 7/1977 | Dahlkvist et al. | 92/29 |
| 4,234,062 A | * | 11/1980 | Kerscher et al. | 188/170 |
| 4,364,305 A | * | 12/1982 | Dalibout et al. | 92/63 |
| 4,478,319 A | * | 10/1984 | Casalone et al. | 188/170 |
| 4,649,804 A | * | 3/1987 | Oberlander | 92/63 |
| 4,777,867 A | * | 10/1988 | Severinsson et al. | 92/29 |
| 5,215,170 A | * | 6/1993 | Rapa | 188/170 |
| 5,937,974 A | * | 8/1999 | Cathcart et al. | 188/203 |
| 6,378,668 B1 | * | 4/2002 | Zemyan et al. | 188/170 |
| 6,435,321 B1 | * | 8/2002 | Asano | 188/170 |

* cited by examiner

*Primary Examiner*—Matthew C. Graham
*Assistant Examiner*—Benjamin A Pezzlo
(74) *Attorney, Agent, or Firm*—James Ray & Associates

(57) ABSTRACT

To provide a brake cylinder unit wherein both the normal brake and the spring brake that is used as a parking brake, etc., can act, and in addition wherein it is possible to shorten the axial direction length. In a brake cylinder unit (1) wherein both the normal-service brake means (2) and the spring brake means (3) can act, there is provided a clutch means (4) that links the rod (111) and the second piston (21) when the pressure fluid ceases to act on the second action chamber (24) of the spring brake means (3), and the first piston (21) starts to move towards to the rod (111). This clutch means (4) comprises a screw (31) that is provided on the rod (111), a nut member (32) that is provided on the second piston (21) such that it can rotate, and a stop means (33) that stops the rotation of the nut member (32) when the second piston (21) starts to move towards the rod (111).

16 Claims, 9 Drawing Sheets

BRAKE CYLINDER UNIT

FIELD OF THE INVENTION

The present invention relates to a brake cylinder unit with which a normal-service brake and a spring brake used as a parking brake, etc., can be operated, and relates in particular to brake cylinder unit that can shorten the axial length.

BACKGROUND OF THE INVENTION

In addition to a normal-service brake unit that acts with compressed air, a spring brake unit that acts by means of spring force without any compressed air is used in cases where a railway car is stopped for a long period of time, for the truck brake unit of for example railway cars. When one configures the truck brake unit by installing the normal-service brake unit and the spring unit separately and independently, installation space becomes necessary.

Accordingly, a brake cylinder unit that composes an air brake unit and a spring brake unit in a monobloc has been developed, such that it makes both brake units act through the medium of the same piston rod.

For example, as shown in FIG. 15, in Japanese Public Patent Disclosure Bulletin S55-160646, there is disclosed a brake cylinder unit (90) equipped with (a) a normal-service brake means (91) that possesses a first piston (93) wherein a rod (931) protrudes, and a first spring (95) acts in opposition to a first action chamber (94), and wherein the first piston (93) moves in the brake direction by overcoming the impetus of the first spring (95) when a pressure fluid acts on the first action chamber (94), and (b) a spring brake means (92) that possesses a second piston (98) wherein the rod (931) passes completely through and that is provided such that it can move in the axial direction of the rod (93), and wherein a second spring (97) acts in opposition to a second action chamber (96), and the second piston (98) moves in the brake direction due to the impetus of the second spring (97) when the pressure fluid ceases to act on the second action chamber (96), and a mating part (932) whereby the second piston (93) is in contact with the rod (931) has been formed.

When the pressure fluid acts on the first action chamber (94) of the normal-service brake means (91), the first piston (93) and the rod (931) move in the brake direction in opposition to the first spring (95), and it becomes the normal-service brake unit shown in the figure. In this normal-service brake unit, when the pressure fluid ceases to act on the first action chamber (94) of the common-service means (91) and the second action chamber (96) of the spring brake means (92), the second piston (98) moves in the brake direction along the rod (931) due to the second spring (97). When this second piston (98) contacts the mating part (932), the impetus of the second spring (97) is transmitted to the rod (931), and the spring brake acts instead of the normal-service brake.

As shown in Japanese Public Patent Disclosure Bulletin S55-160646, in the event that a mating part (932) is formed on the rod (931), the mating part (932) is provided by making it capable of sliding on the tip side of the rod (931) such that the mating part (932) does not come into contact with the second piston (98), when one relaxes the normal-service brake means (91) and shortens the rod (931) by means of the impetus of the first piston (95). For this purpose, it is necessary for the second piston (98) to move along the rod (931) by just the distance L shown in the figure, until the second piston (98) is in contact with the mating part (932) of the rod (931). As a result, there is the problem that the axial direction length of the brake cylinder (90) becomes longer, by just that amount equivalent to the length L.

In addition, in Utility Model Registration Bulletin H08-5881, there is proposed a brake cylinder unit that is fitted to a sleeve, of which one end can contact the second piston (98) on the outer periphery of the rod (931), and of which the other end can contact the stage part of the large bore part that has been provided on the rod (931), instead of the mating part (932). However, since it is possible to fit only a sleeve with a length to the extent for which the first piston (93) and the rod (931) can be shortened during the releasing of the normal-service brake means (91), it is necessary for the second piston (98) to move a considerable distance until it causes the spring brake (92) act, just as in the case of Japanese Public Patent Disclosure Bulletin S55-160646, and there is the problem that the axial direction length of the brake cylinder unit (90) becomes long.

SUMMARY OF THE INVENTION

Accordingly, the present invention takes as its purpose the provision of a brake cylinder unit whereby both the normal-service brake and the spring brake that is used as a stop brake, etc., can act, and that moreover can shorten the axial length.

The invention in the first embodiment for attaining the above-mentioned purpose is a brake cylinder unit, being a brake cylinder unit with which both a normal-service brake and a spring can be operated that is equipped with (a) a normal-service brake means that possesses a first piston wherein a rod protrudes, and a first spring acts in opposition to a first action chamber, and wherein the above-mentioned first piston moves in the brake direction by overcoming the impetus of the above-mentioned first spring when a pressure fluid acts on the above-mentioned first action chamber, and (b) a spring brake means that possesses a second piston wherein the above-mentioned rod passes completely through and that is provided such that it can move in the axial direction of the above-mentioned rod, which is characterized by the fact that a second spring acts in opposition to a second action chamber, and the above-mentioned second piston moves in the above-mentioned brake direction due to the impetus of the above-mentioned second spring when the pressure fluid ceases to act on the above-mentioned second action chamber, wherein there is provided a clutch means that links the above-mentioned rod and the above-mentioned second piston when the pressure fluid ceases to act on the above-mentioned second pressure chamber, and the above-mentioned second piston begins to move towards the above-mentioned rod.

According to the above-mentioned composition, when the second action chamber ceases to act, and the second piston starts to move towards the rod, the rod and the second piston are linked by the clutch means, and the spring brake acts on the rod through the medium of the second piston. Owing to this, the amount of movement of the second piston is smaller.

BRIEF DESCRIPTION OF THE INVENTION

Figure 1:
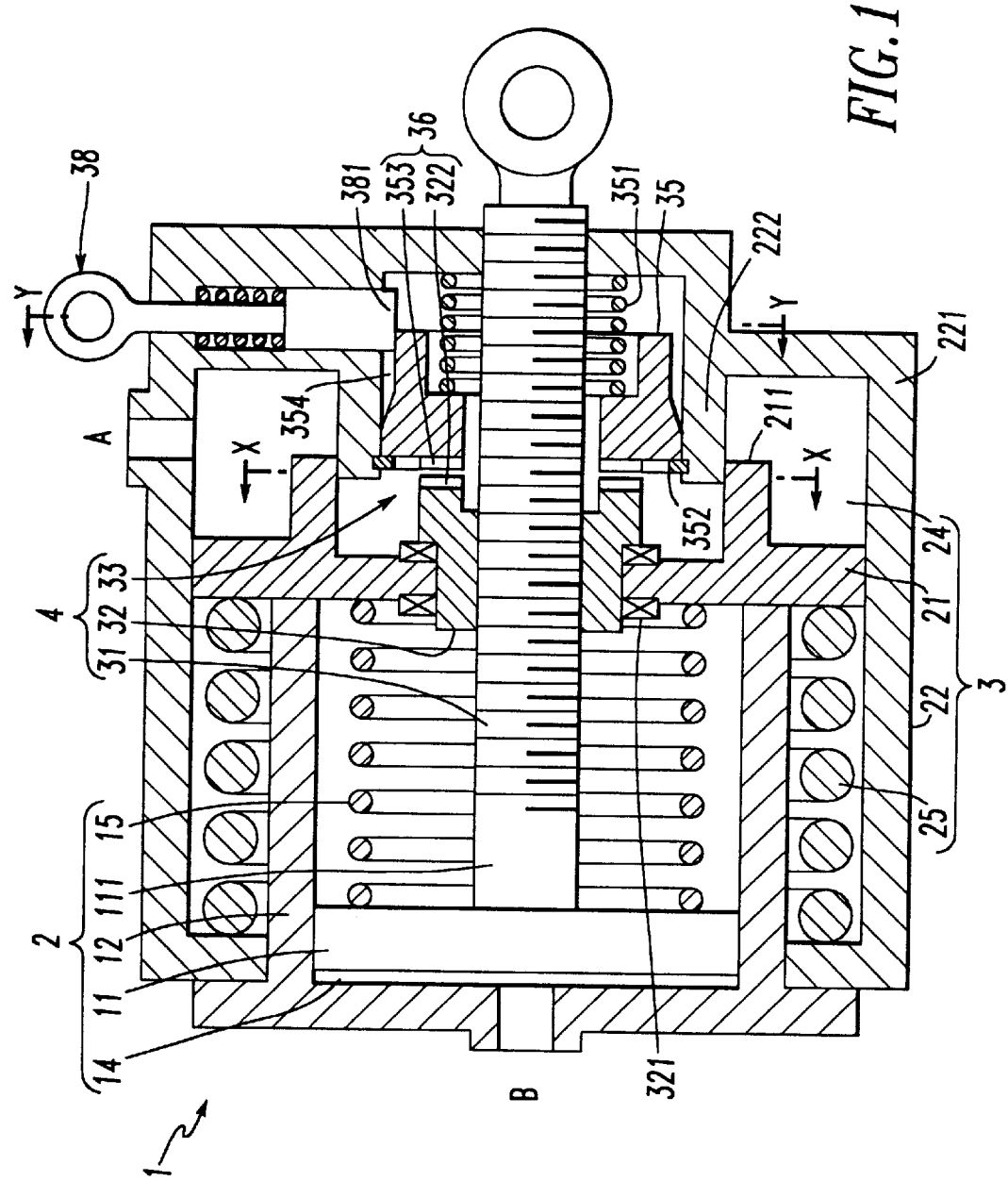
FIG. 1 is a section of the brake cylinder unit for one mode of carrying out the present invention.
Figure 2:
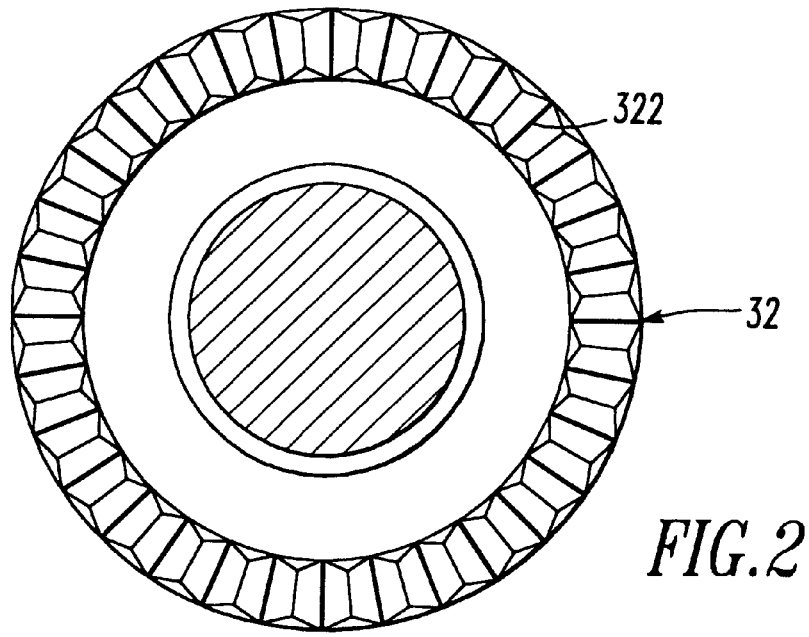
FIG. 2 a section along the X—X line of FIG. 1.
Figure 3:
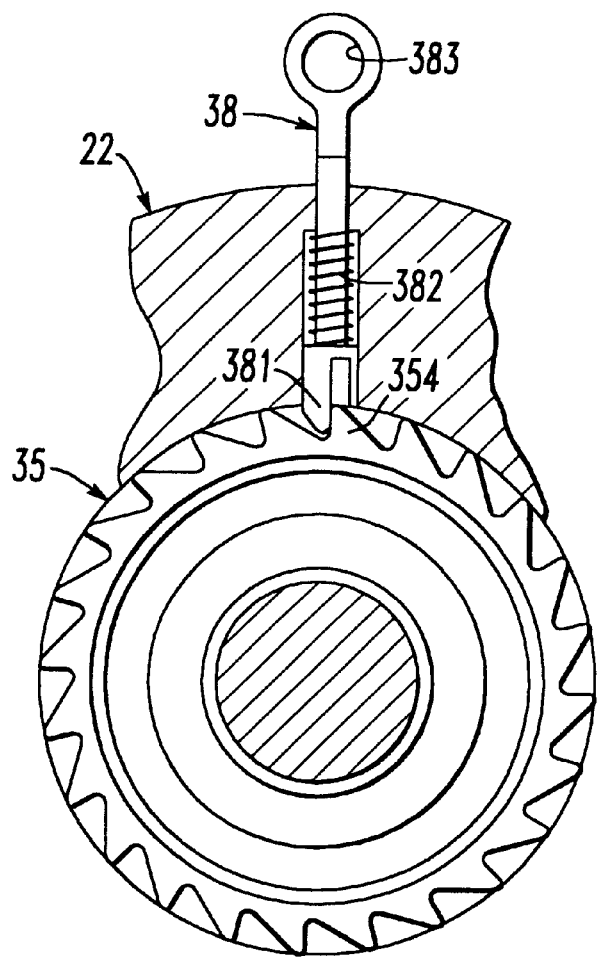
FIG. 3 is a section along the Y—Y line of FIG. 1.

An explanation is now provided of one mode for carrying the brake cylinder unit that constitutes the present invention, with reference to figures. FIG. 1 is a section of the brake cylinder unit for one mode of carrying out the present invention. FIG. 2 a section along the X—X line of FIG. 1. FIG. 3 is a section along the Y—Y line of FIG. 1.

In FIG. 1, the brake cylinder unit (1) is composed by providing a clutch means between the rod (111) of the normal-service brake means (2) and the piston (2) of the spring brake means (3), so that the normal-service brake means (2) that acts due to the fluid pressure of compressed air, etc., and the spring brake means (3) that acts due to the impetus of the spring (25), are caused to act through the medium of the same rod (21).

The normal-service brake means (2) possesses a first piston (11) wherein the rod (111) protrudes on one side (the 20 brake direction), and a first cylinder (12) wherein this first piston (11) is inserted so that it can slide freely and the other side (the anti-brake direction) is closed, is provided between the other side of the first piston (11) and the first cylinder (12), and is composed by opposing a first action chamber (14) wherein compressed air is supplied through a first port B and a first spring that is arranged on one side of the first piston (11).

The spring brake means (3) possesses a second piston (21) wherein the rod (111) passes completely through and that can move in the axial direction of the rod (111), and a second cylinder (22) that closes the end on one side of the outer tube (221) that is inserted such that the outer periphery of the second piston can slide freely and the inner tube (222) that is inserted such that the inner periphery of the cylindrical protrusion (211) of the second piston (21) can slide freely, is provided between the one side of the second piston (21) and the second cylinder (22), and is composed by opposing the second action chamber (24) wherein compressed air is supplied through a second port A, and the second spring (25), which is arranged in the space between the ends of the outer tube (221), which is the other side of the second piston (21).

The clutch means (4) comprises a screw (31) that is provided on the outer periphery of the rod (111), a nut member (32) that is supported on the second piston (21) through the medium of a bearing (321) such that it can rotate freely, and stop means (33) that stops the rotation of the nut member (32) when the second piston (21) begins to move towards the rod (111). It is acceptable for the nut member (32) to be supported such that it can rotate freely relative to the rod (111), and wherein a screw is formed in the space of the second piston (21)

The stop means (33) comprises a sleeve member (35) whose surface opposes the nut member (32), and a gearing means (36) that is provided on the surface where the nut member (35) and the sleeve member are opposed. This sleeve member (35) is inserted such that it can slide freely in an axial direction along the inner tube (222), is impelled towards the stopper ring (352) on the other side due to the spring (351), and the rotation in one direction is stopped by the lock lever (38).

The gearing means (36) comprises, as shown in FIG. 2, comprises an uneven blade (322) that is formed on the surface of one side of the nut member (32), and an uneven blade (353) that is formed on the surface of the other side of the sleeve member (35), and that possesses the same form as that in FIG. 2.

As shown in FIG. 3, a latch blade (354) that extends in an axial direction has been provided on the outer periphery of the sleeve member (35), and a blade tip (381) that is impelled in the protruding direction relative to the latch blade (354) has been provided on the tip of the lock lever (38). This latch blade (354) and blade tip (381) are a one way latch that stops the accompanying revolution due to the rotation that accompanies the movement of the nut member (32) towards the other side (the brake direction), and that allows the accompanying revolution due to the rotation towards the other side (the anti-brake direction) of the nut member (32).

In addition, the blade tip (381) of the lock lever (38) is impelled towards the latch blade (354) due to the spring (382) that is provided inside the second cylinder (22), and in addition it is separated from the latch blade (354) in opposition to the impetus of the spring (382) when the eyelatch (383) is pulled up. Returning to FIG. 1, the latch blade (354) of the sleeve member (35) extends in an axial direction, and the blade tip (381) of the lock lever (38) is mated to the end of one side of the latch blade (354), so even if the sleeve member (35) slides to one side, the mating between the latch blade (354) and the blade tip (381) is maintained. The lock lever (38) that possesses the functions described above comprises a freely engageable and disengageable lock means that stops the rotation of the sleeve member (35).

Figure 4:
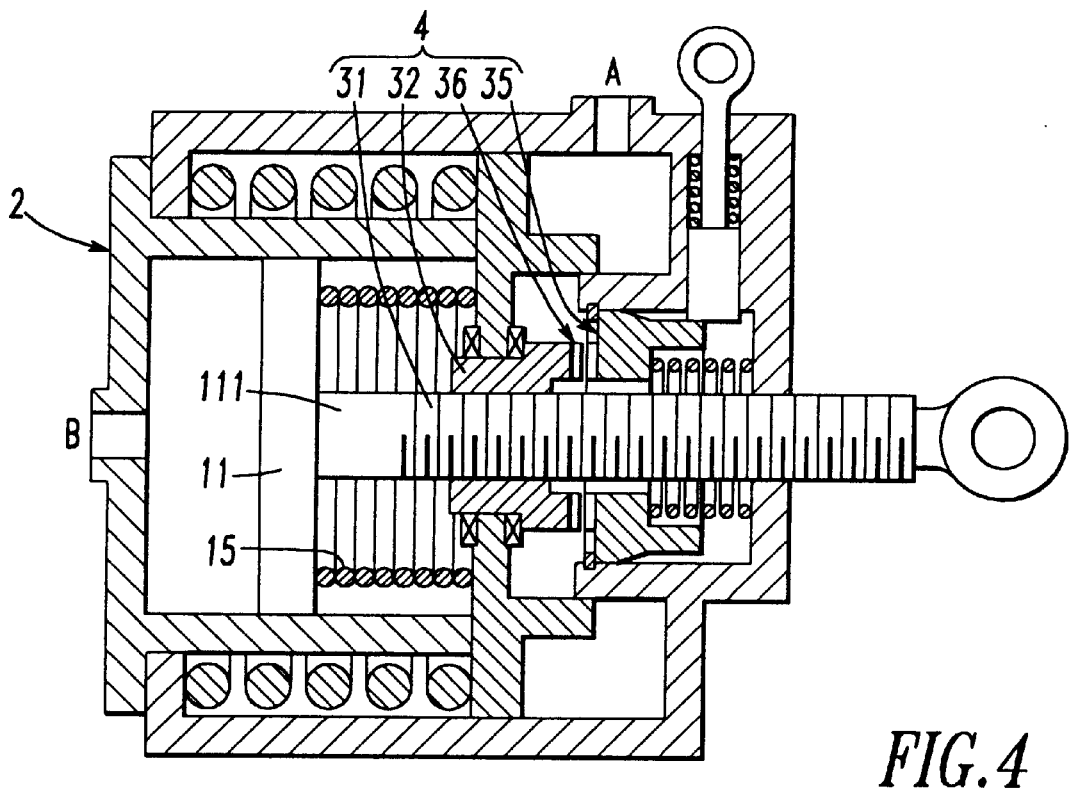
FIG. 4 is an action explanation diagram that shows the time of action of the brake cylinder unit in FIG. 1.
Figure 5:
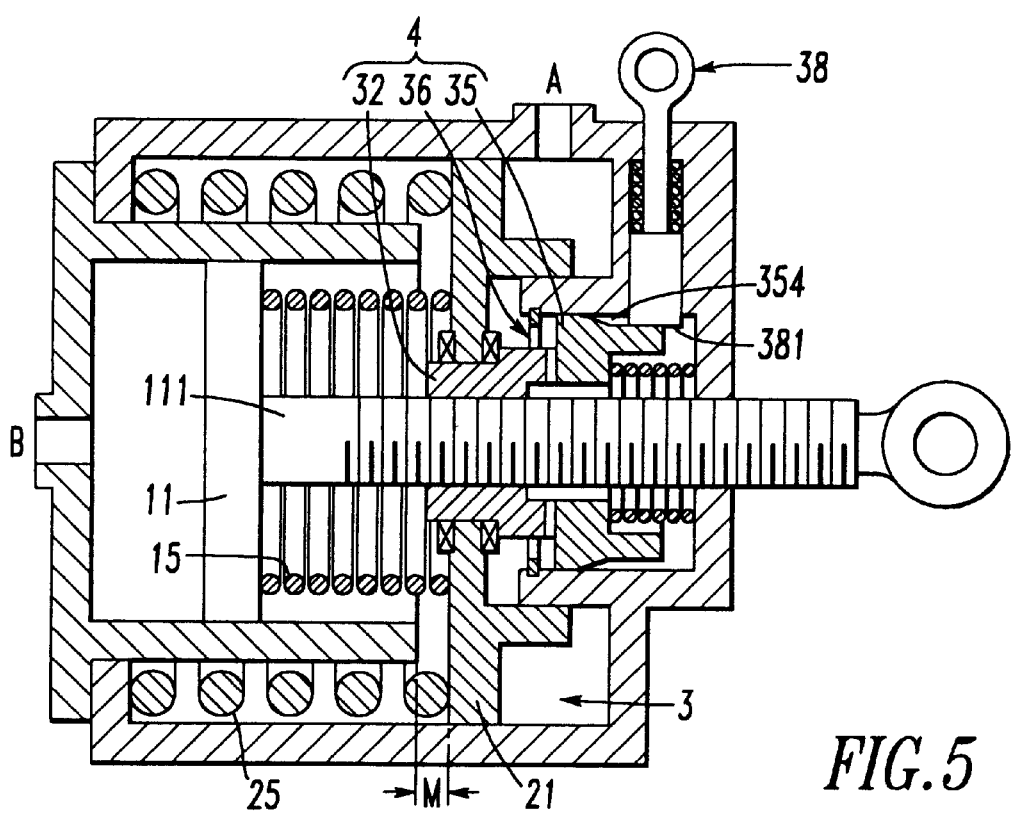
FIG. 5 is an action explanation diagram that shows the time of action of the brake cylinder unit in FIG. 1.
Figure 6:
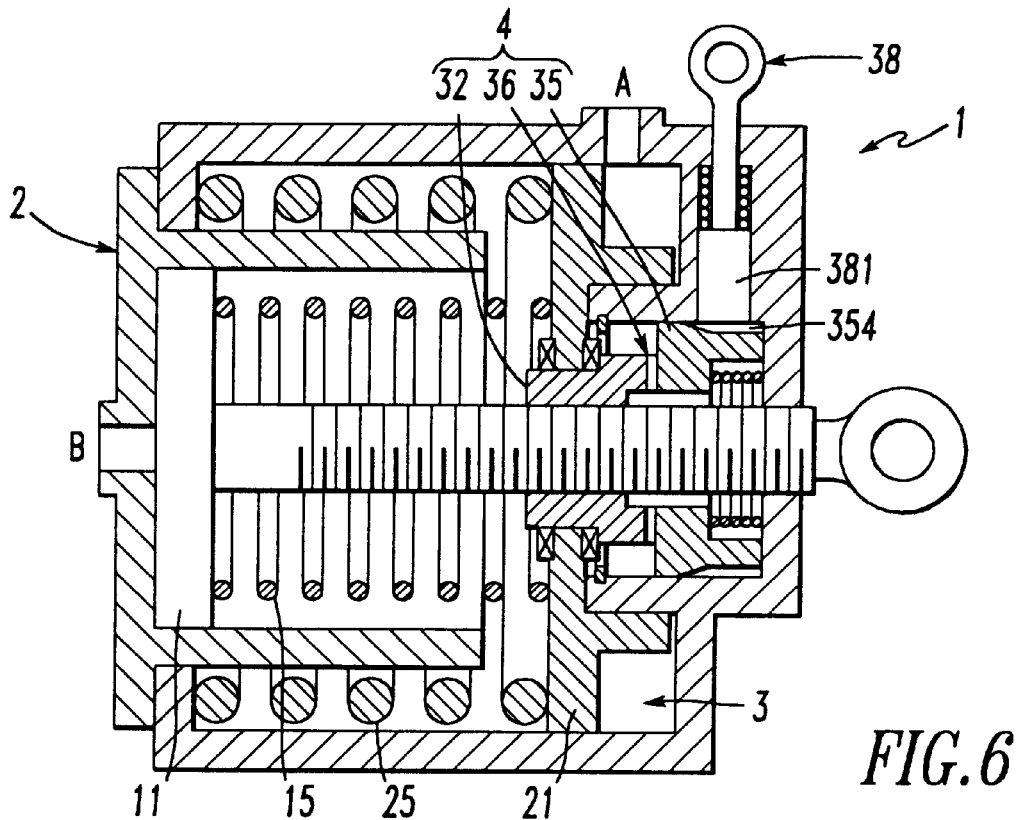
FIG. 6 is an action explanation diagram that shows the time of action of the brake cylinder unit in FIG. 1.

An explanation is provided below of the action of the brake cylinder unit (1) that possess the above composition. FIG. 1 shows an operating position wherein both the normal-service brake means (2) and the spring brake means (3) have been relaxed. FIG. 4 shows the air brake position wherein the normal-service brake means (2) is acting. FIG. 5 shows the spring brake position wherein the spring brake means (3) is acting. FIG. 6 shows a state wherein the spring brake means (3) has been released manually.

In the operating position in FIG. 1, compressed air is supplied to the second port A, so the second piston (21) has been pushed in the anti-brake direction in opposition to the impetus of the second spring (25), and has stopped in contact with the end of one side of the first cylinder (12). In this relaxed position of the spring brake means (3), the gearing means (36) between the nut member (32) and the sleeve member (35) is in a non-meshed state whereby a small gap is interposed between them, and clutch means is in a non-engaged state. In addition, since the compressed air is discharged from the first port B, the first piston (11) has moved to the end of the other side of the first cylinder (12) due to the impetus of the first spring (15). In the relaxed position of this normal-service brake (2), the rod (111) is in a state where it is shortened in an anti-brake direction.

In the air brake position in FIG. 4, when compressed air is supplied to the first port B, the first piston (11) and the rod (111) try to move in the brake direction in opposition to the impetus of the first spring (15). At this time, the gearing means (36) between the nut member (32) and the sleeve member (35) is in a non-meshed state, and the clutch means (4) maintains a non-engaged state. Since the nut member (32) rotates due to the screw (31) of the rod (111), the first piston (11) and the rod (111) move in the brake direction, and the requisite air braking force is generated.

In the spring brake position in FIG. 5, when the compressed air of the second port A is exhausted in a state where compressed air has been supplied to the first port B, the second piston (21) attempts to move in the brake direction due to the impetus of the second spring (25). At this time, the nut member (32) moves along with the second piston (21), so the gearing means (36) between the nut member (32) and the sleeve member (35) ends up in a geared state, that is, the clutch means (4) is engaged, and the rotation of the nut member (32) is stopped. Since the latch blade (354) of the sleeve member (35) has been mated with the blade tip (381) of the lock lever (38), the sleeve member (35) slides in an axial direction along with the second piston (21), with the rotation stopped. When this happens, the second piston (21) forms one unit with the rod (111) through the medium of the nut member (32) whose rotation has stopped, the rod (111) maintains a state where it has moved in the brake direction due to the impetus of the second spring (25), and the requisite spring braking force is generated. In this spring brake position, the spring braking force is assured even if the pressure of the compressed air that has been supplied to the first port B falls, due for example to a leak in the pipe.

In the event that one returns from the spring brake position in FIG. 5 to the air brake position in FIG. 4, compressed air is supplied to the first port B and the second port A, so the first piston (11) maintains the air brake position shown in the figure, but the second piston (21) attempts to move in the anti-brake direction in opposition to the impetus of the second spring (25). At this time, the nut member (32) and the sleeve member (35) maintain a state where the gearing means (36) is meshed, but as shown in FIG. 3, the rotation in a clockwise direction wherein the nut member (32) moves in an anti-brake direction is allowed due to the fact that the latch blade (354) clears the blade tip (381). Owing to this, the nut member (32) in FIG. 5 rotates, the second piston (21) moves towards the position in FIG. 4, and one returns to the state in FIG. 4, where the gearing means (36) between the nut member (32) and the sleeve member (35) is separated.

In the spring brake position in FIG. 5, it is possible to release the spring braking force manually in the event that the compressed air cannot be supplied due to a breakdown of the air compressor or breakage of the pipes.

In the case of manual release of the Spring brake in FIG. 6, when the lock lever (38) is pulled up in the direction of the arrow show in the figure, the blade tip (381) is separated from the latch blade (354) of the sleeve member (35), and the gearing means (36) between the nut member (32) and the sleeve member (35) becomes capable of rotating while maintaining a meshed state, and the entire clutch means (4) idles. When this happens, both the first piston (11) and the second piston (21) can move mutually to the stroke end due to the impetus of the first spring (15) and the second spring (25), and the first piston (11) and the rod (111) move in an anti-brake direction. As a result, the spring brake is released manually, and it is possible to move the railway cars, etc.

In the brake cylinder unit explained above, as shown in FIG. 5, the clutch means acts due to the movement of the second piston (21) in the event of switching from the air brake position to the spring brake position, and the rod (111) and the second piston (21) are linked, so the spring brake means (3) acts with slight movement distance M of the second piston (21). Owing to this, it is possible to shorten the axial direction length of the brake cylinder unit (1) that unites in one unit the normal-service brake means (2) and the spring brake means (3). In addition, since the second spring (25) extends only by the slight distance M and causes the prescribed impetus to act on the second piston (21), it is possible to use a second spring (25) with a small linear diameter compared to one that causes the prescribed impetus to act after it is extended by a long distance.

In addition, in FIG. 1, the clutch means (4) is equipped with a screw (31), a nut member (32) and a stop means (33), the movement of the second piston (21) is converted into the rotation of the nut member (32), and the clutch means (4) is engaged only to the extent that the stop means (33) stops the rotation of the nut member (32). Owing to this, it is possible to compose the clutch means (4) with a combination of machine parts, and it is possible to configure the clutch means (4) with a simple composition.

In addition, in FIG. 1, the stop means (33) is equipped with a sleeve member (35) and a gearing means (36), and when the nut member (32) moves towards the sleeve member (35), the clutch means (4) ends up engaging due to the gearing means (36). Owing to this, the clutch means (36) acts with certainty.

In addition, in the spring brake position in FIG. 5, the lock lever (lock means) (38) that stops the rotation of the sleeve member (35) has been configured such that it can be freely engaged and disengaged, so when one pulls the lock lever (38), it is possible to release the spring brake simply by hand as shown in FIG. 6.

In addition, in FIG. 1, the clutch means (4) has been provided on the inner peripheral side of the inner tube (222) of the second cylinder (22) of the spring brake means (3), so it is possible to incorporate the clutch means (4) without making the axial direction length of the brake cylinder unit (1) longer. Since an ordinary second cylinder (22) (the second piston (21)) is configured with a larger diameter than the first cylinder (12) (the first piston (11)), space for receiving the clutch means (4) in the inner periphery of the second piston (22) is readily obtained.

Moreover, in FIG. 1, the first spring (15) of the normal-service brake means (2) and the second spring (25) of the spring brake means (3) have been arranged such that they overlap in a diametrical direction, so it is possible to unite the normal-service brake means (2) and the spring brake means (3) in one unit by shortening the axial direction length, and it is possible to reduce the axial direction length of the brake cylinder unit (1) to a minimum, along with the shortening of the axial direction length due to the adoption of the clutch means (4).

Figure 7:
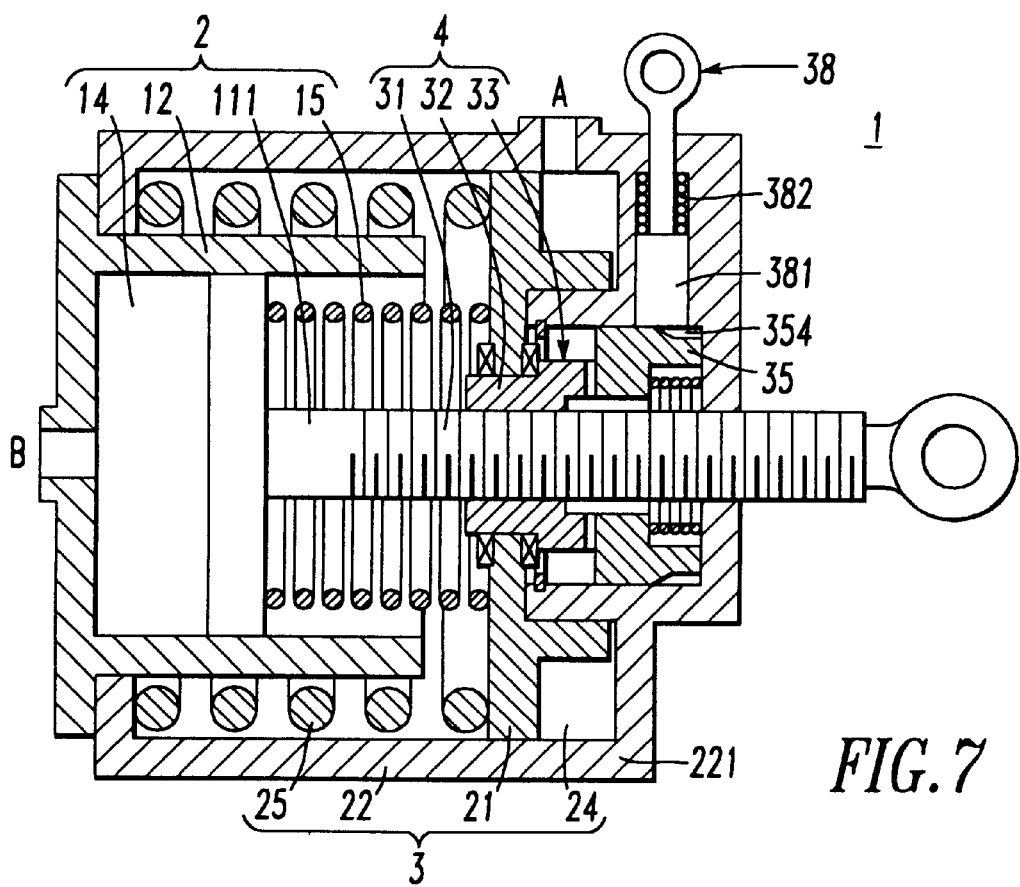
FIG. 7 is a section that shows an example of an altered form of the brake cylinder unit that constitutes the present invention, and the time of the action of the same.

FIG. 7 shows an altered example of the brake cylinder unit, and the air brake position wherein the normal-service brake means (2) acts after the spring brake is released manually. In the manual release of the spring brake in FIG. 6, the spring brake is released manually, after which the lifting up of the lock lever (38) is freed, whereupon the lock lever (38) is moved to the sleeve member (35) side by the impetus of the spring (382), and the blade tip (381) and the latch blade (354) are caused to mate once again. Then, by preserving the air compressor and supplying compressed air to the second port A, it is possible to return the second piston (21) to the operating position in FIG. 1 in opposition to the impetus of the second spring (25).

Once it has been returned to the operating position, in the event that it is not possible to supply compressed air to the second port A due to breakdowns of the control solenoid valve, etc., the first piston (11) becomes one unit with the second piston (21), and the normal-service brake means (2) can no longer act, due to the meshing of the nut member (32) and the sleeve member (35) and the mating of the blade tip (381) and the latch blade (354).

In the brake cylinder unit (1A) in FIG. 7, the unit has been configured so that the action of the normal-service brake means (2) is possible even when it is not possible to supply compressed air to the second port A, in the manual release of the brake means in FIG. 6. In FIG. 7, the axial direction length of the latch blade (354) has been adjusted so that it is shorter than the item in FIG. 1. The axial direction length of the latch blade (354) has been set such that it is possible to mate the latch blade (354) and the blade tip (381) at the operating position in FIG. 1, the air brake position in FIG. 4 and the spring brake position in FIG. 5, and such that the latch blade (354) and the blade tip (381) cease to be mated when the second piston has moved to the vicinity of the stroke end of the brake direction along with the sleeve member (35), as shown in FIG. 7.

As explained by FIG. 6, when the lifting up of the lock lever (38) is freed after the spring brake is released manually, the lock lever (38) is moved to the sleeve member (35) side by the impetus of the spring (382).

Then, in the air brake position in FIG. 7, the blade tip (381) of the lock lever (38) is pressed to the outer periphery of the sleeve member (35), without any mating to the latch blade (354). In this state, the nut member (32) and the sleeve member (35) become capable of rotating in a meshed state, and this allows the movement of the first piston (11).

Owing to this, this first piston (11) moves in the brake direction while causing the nut member (32) and the sleeve member (35) to rotate, due to the supply of compressed air from the first port B, and causes the normal-service brake to act. In addition, the first piston (11) moves in the anti-brake direction due to the impetus of the first spring (15), due to the fact that compressed air is exhausted from the first port B, and releases the normal service brake means (2). As a result, it becomes possible for the car to travel all the way to the depot by causing the air brake to act, even if it is not possible to supply compressed air to the second port A after the spring brake has been manually released.

In this manner, since the axial direction length of the latch blade (354) in FIG. 7 has been adjusted so that it is shorter than that of the item in Figure, it is possible to make the cars travel all the way to the depot by causing the air brake to act, even when there arises a case where it is not possible to supply compressed air to the second port A.

Figure 8:
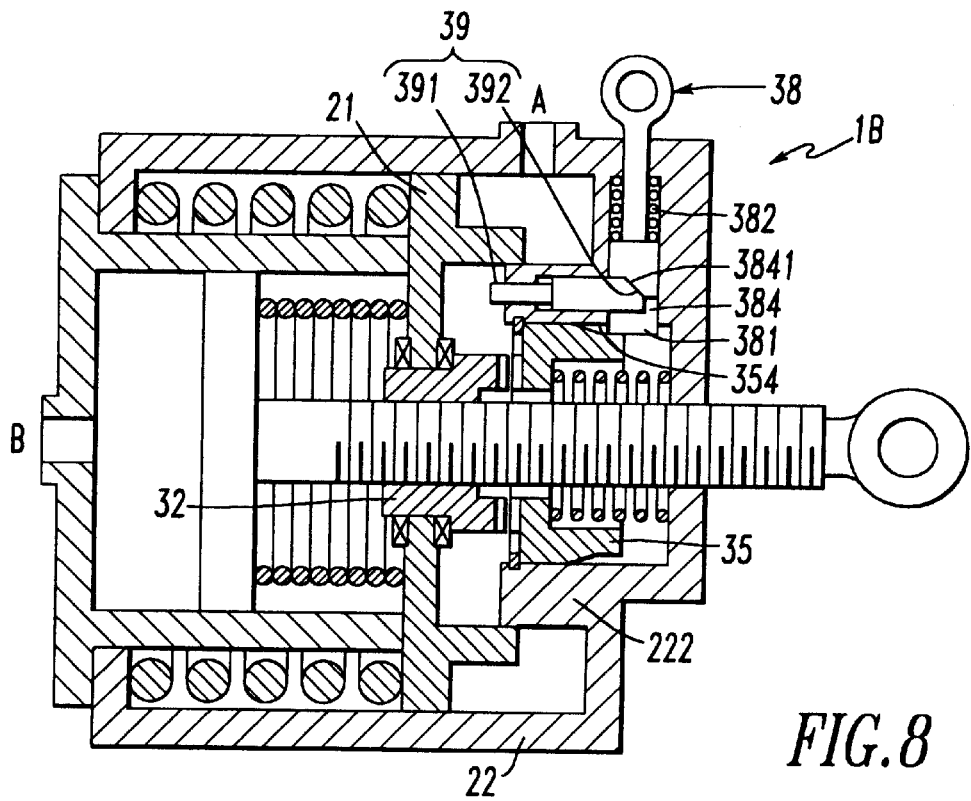
FIG. 8 is a section for the brake cylinder unit for another altered form of the present invention.
Figure 9:
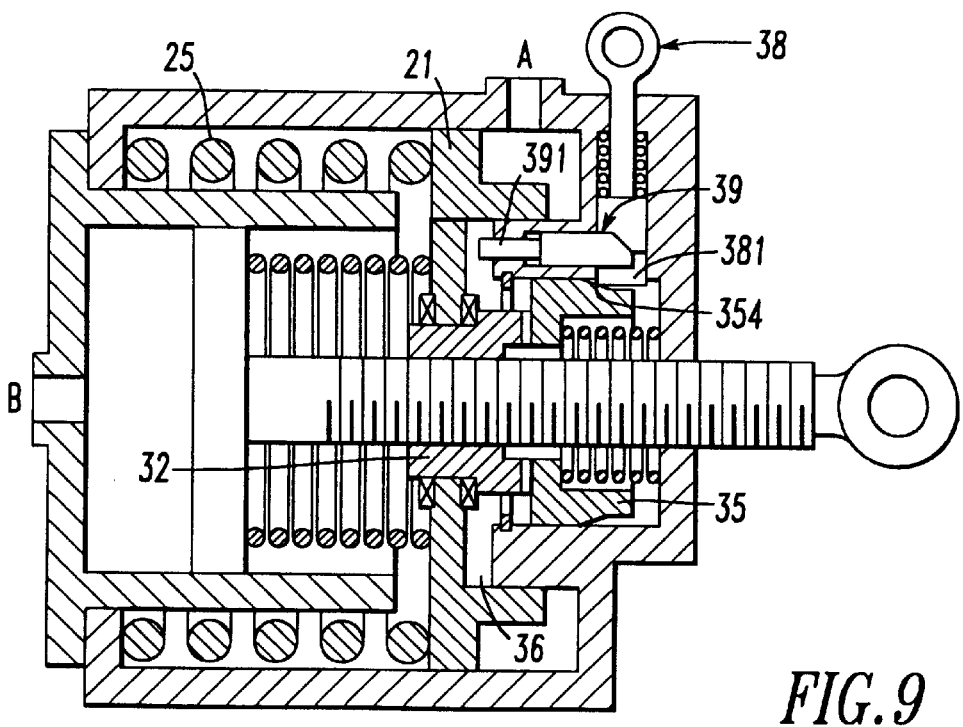
FIG. 9 is an action explanation diagram that shows the time of action of the brake cylinder unit in FIG. 8.
Figure 10:
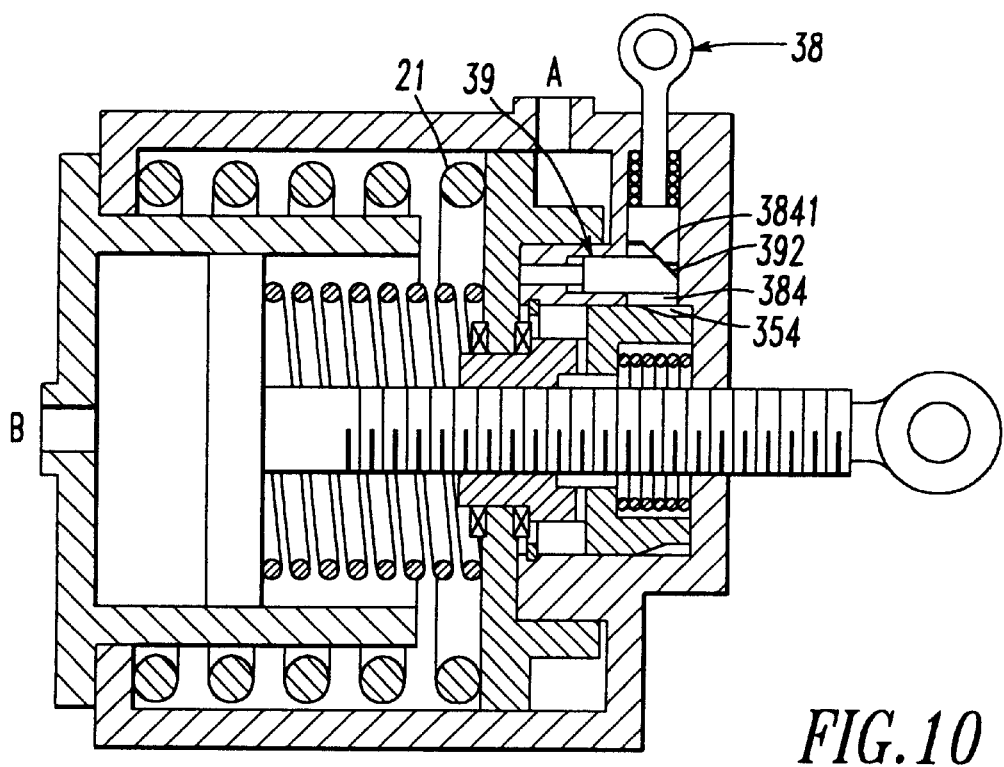
FIG. 10 is an action explanation diagram that shows the time of action of the brake cylinder unit in FIG. 8.

An explanation is now offered of another brake cylinder unit (1B) for another altered example, based on FIG. 8 through FIG. 10. FIG. 8 shows the action state in the air brake position, FIG. 9 shows the action state in the spring brake position, and FIG. 10 shows the action state in the air brake position when the spring brake is killed. In FIG. 8, the points of difference with FIG. 1 are the facts that a slide pin (39) that is pushed by the second piston (21) has been provided on a portion of the inner tube (222) of the second cylinder (22), and that the lock lever (38) has been switched from the locked position to the unlocked position by this slide pin (39). All other points are the same as in FIG. 1.

The slide pin (39) has been built into the inner tube (222) such that it can slide freely in an axial direction. The side that opposes the second cylinder (21) of the slide pin (39) has been configured as a pin (391) that protrudes from the side wall of the inner tube (222), and the side that mates with the lock lever (38) of the slide pin (39) has been configured as an inclined surface (392). A horizontal hole (384) that possesses an inclined surface (3841) has been formed on the part where the slide pin (39) mates while it reaches the tip of the lock lever (38). In a state where the inclined surface (391) of the slide pin (39) has mated with the inclined surface of the lock lever (38), the pin (391) has protruded from the side wall of the inner tube (222), and the blade tip (381) of the lock lever (38) impelled by the spring (382) has mated with the latch blade (354) of the sleeve member (35).

An explanation is now provided of the action of this brake cylinder unit (1B). In FIG. 8, when compressed air is supplied to the second port A, the nut member (32) and the sleeve member (35) are in a non-meshed state, and the air brake acts in accordance with the compressed air that is supplied to the first port B. In FIG. 9, when compressed air is exhausted from the first port B and the second port A, the nut member (32) and the sleeve member (35) mesh at the gearing means (36), and the rotation of the nut member (32) is stopped, so the spring brake acts due to the second spring (25). In FIG. 9, since the spring brake is released, when one pulls up the lock lever (38), the mating of the blade tip (384) of the lock lever (38) and the latch blade (354) of the sleeve member (35) is separated. When this happens, the nut member (32) can rotate, the second piston (21) is pushed and moves to the second spring (25), and the pin (391) of the slide pin (39) is pushed by the second piston (21).

In FIG. 10, when the second piston (21) moves to the stroke end, the inclined surface (392) of the slide pin (39) pushes up the inclined surface (3841) of the lock lever (38), and a state where the mating of the between the blade tip (381) of the lock lever (38) and the latch blade (354) of the sleeve element (35) is separated, that is, an unlocked state, is maintained. In this state, the air brake acts when the second port A is non-pressurized and compressed air is supplied to the first port B. Owing to this, it is possible to make the cars travel to the depot by causing the air brake to act, even in the event that there has arisen a case where it is not possible to supply compressed air to the second port A.

Figure 11:
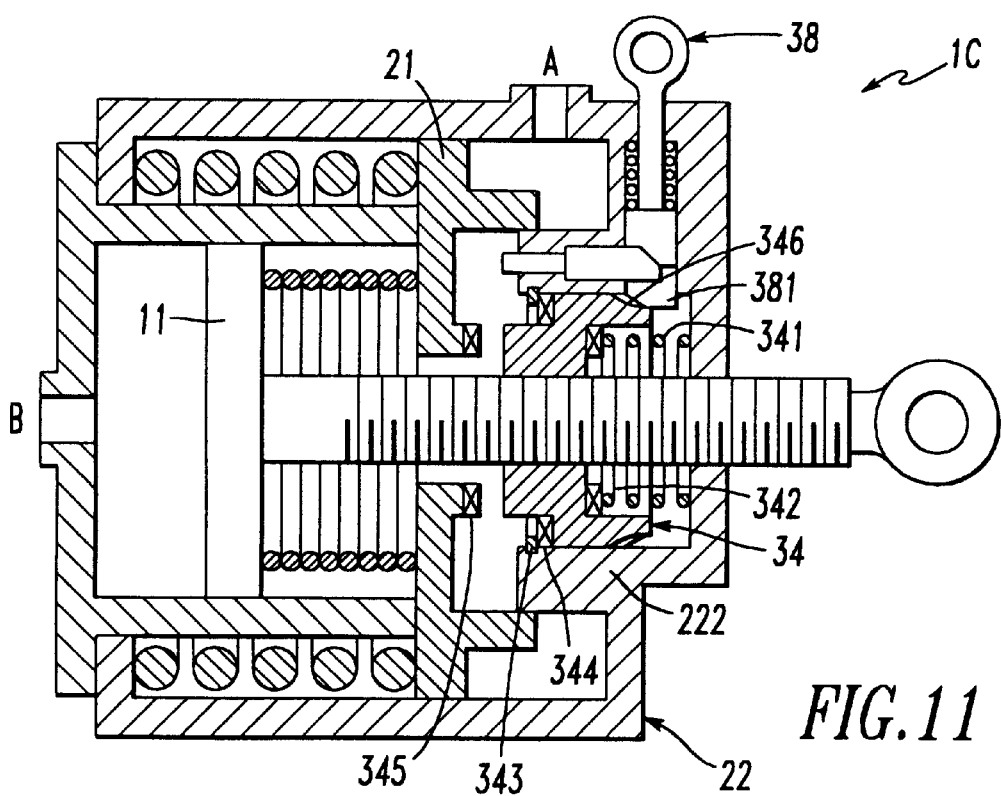
FIG. 11 a section for the brake cylinder unit for yet another altered form of the present invention.
Figure 12:
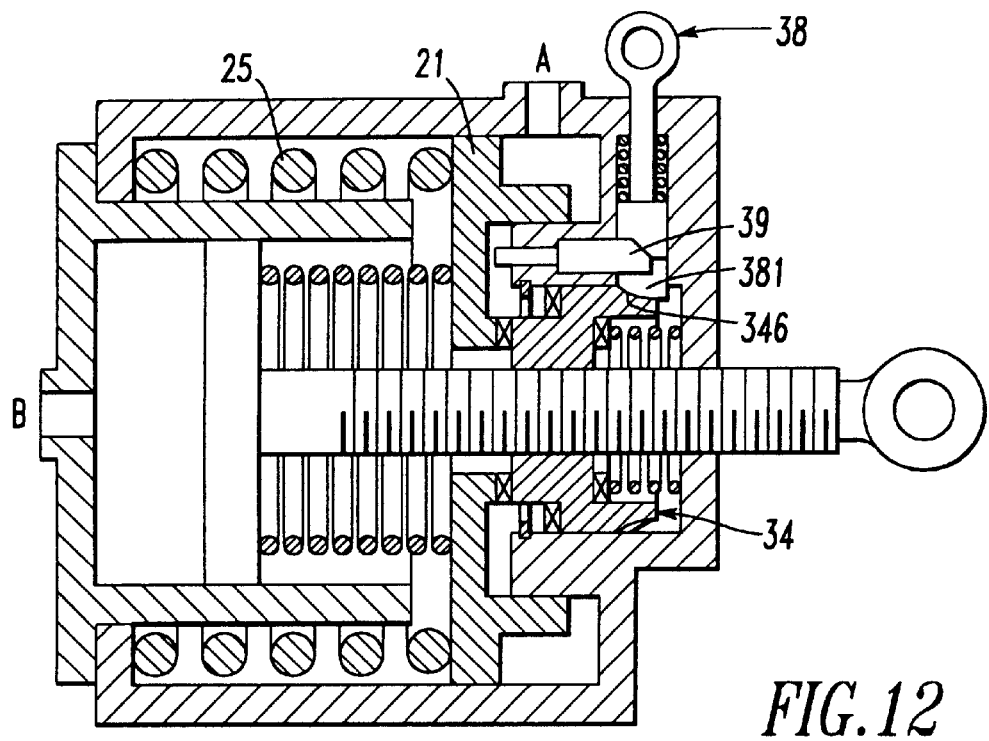
FIG. 12 is an action explanation diagram that shows the time of action of the brake cylinder unit in FIG. 11.
Figure 13:
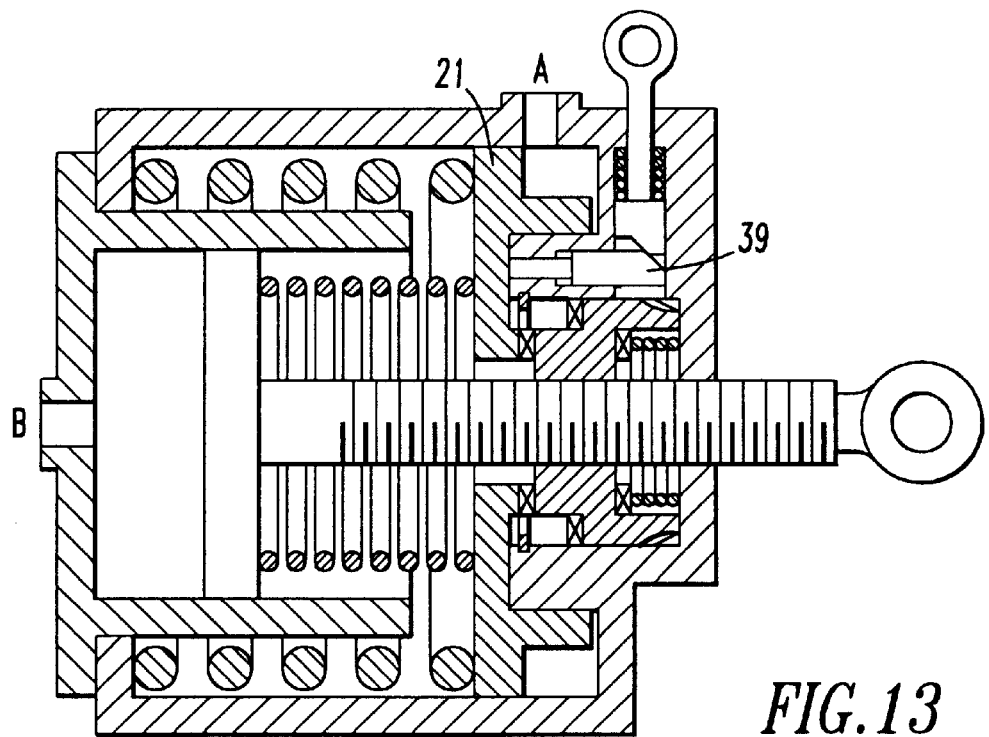
FIG. 13 is an action explanation diagram that shows the time of action of the brake cylinder unit in FIG. 11.

An explanation is now offered of another brake cylinder unit (1B) for another altered example, based on FIG. 11 through FIG. 13. FIG. 11 shows the action state in the air brake position, FIG. 12 shows the action state in the spring brake position, and FIG. 13 shows the action state in the air brake position when the spring brake has been killed. In FIG. 11, the point that differs from FIG. 8 is that the nut member and the sleeve member have been made into a single unit.

The nut member (34) has been supported such that it can slide freely in an axial direction and moreover such that it can rotate freely inside the inner tube (222) of the second cylinder (22). It has been impelled towards the second piston (21) through the medium of the spring (341) and the thrust bearing (342) of the nut member (34). The position facing the second piston (21) has been determined based on the snap ring (343) and the thrust bearing (344). This is a structure wherein a thrust member (345) has been attached to the opposing surface of the nut member (34) of the second cylinder (22), and the second cylinder (22) can push the nut element (34) so that it can rotate. A latch blade (346) that mates with the blade tip (381) of the lock lever (38) has been provided on the outer periphery of the nut member (34). This latch blade (346) and blade tip (381) are configured as a one wake latch that stops the accompanying revolution due to the rotation that accompanies the movement towards one side (the brake direction) of the nut member (34), and that permits the accompanying revolution due to the rotation to the other side (the anti-brake direction) of the nut member (34).

An explanation is now provided of the action of this brake cylinder unit (1C). In FIG. 11, when compressed air is supplied to the second port A, the thrust bearing (345) of the second piston (21) is separated from the nut member (34), and the nut member (34) is free to rotate. Owing to this, the air brake acts in accordance with the compressed air that is supplied to the first port B. In FIG. 12, when compressed air is exhausted from the first port B and the second port A, the second piston (21) cause the nut member (34) to move in an axial direction, the latch blade (346) of the nut member (34) mates with the blade tip (381) of the lock lever (38), and the rotation of the nut member (34) is stopped, so the spring brake acts according to the second spring (25). In FIG. 12, the spring brake has been released, so when one pulls up the lock lever (38), the nut member (34) becomes capable of rotating, and the second piston (21) is pushed and moves to the second spring (25).

In FIG. 13, when the second piston (21) moves to the stroke end, the unlocked state of the lock lever (38) is maintained by the slide pin (39). In this state, the second port A is non-pressurized, and compressed air is supplied to the first port B, the air brake acts. Owing to this, it is possible to make the cars travel to the depot by causing the air brake to act even when there arises a case it is not possible to supply compressed air the second port A after the spring brake is released manually.

In this manner, when the unit is structured such that the nut member (34) and the lock lever (38) mate directly with each other, it is possible to reduce the parts that correspond to the sleeve member (35) in FIG. 8, and it is possible to eliminate the trouble of processing for manufacturing the complex gearing means (36) between the sleeve member (35) and the nut member (32).

Figure 14:
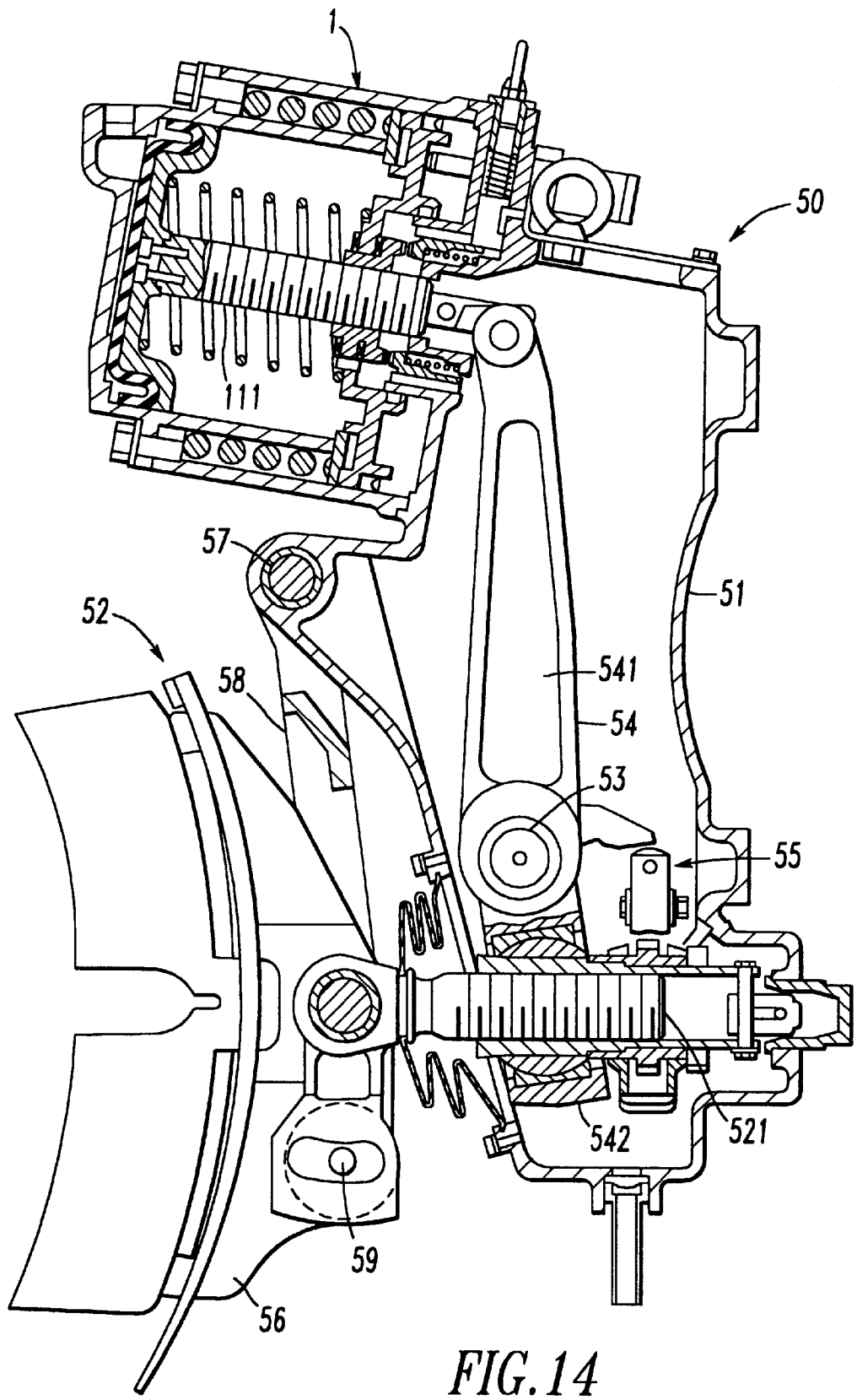
FIG. 14 is a section of the brake unit for railway cars wherein the brake cylinder unit that constitutes the present invention has been incorporated.
Figure 15:
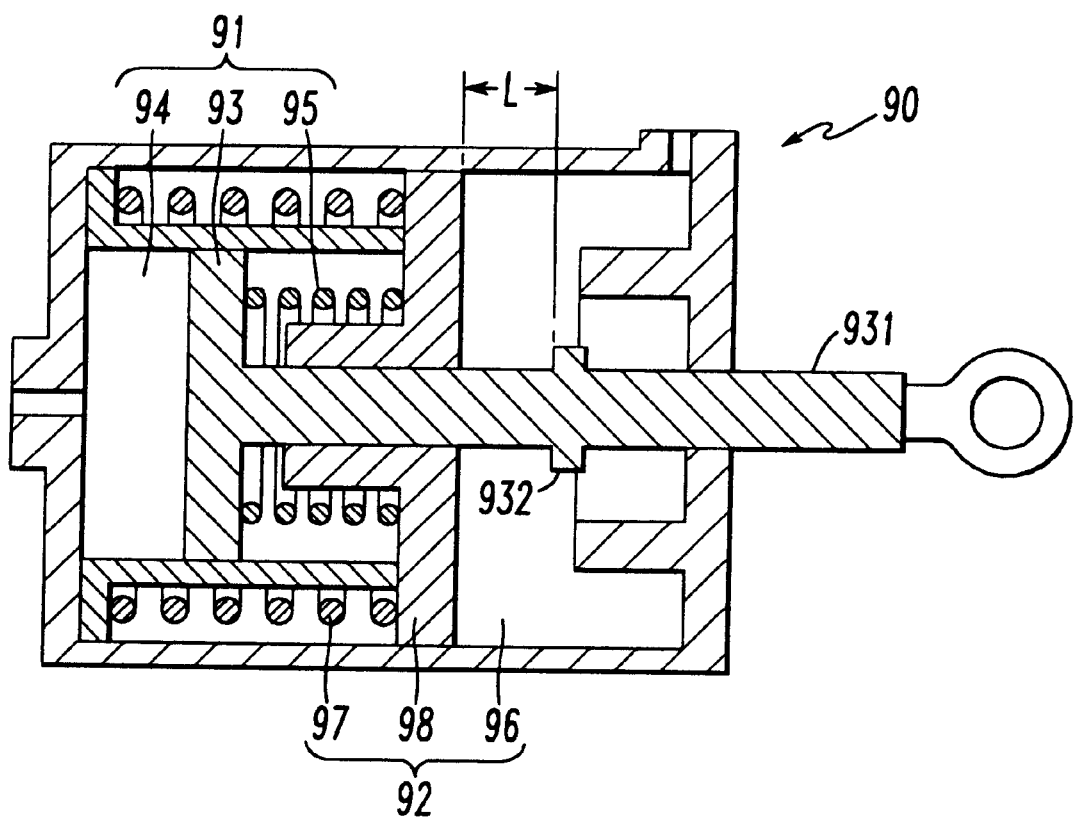
FIG. 15 is a section of a conventional brake cylinder unit.

FIG. 14 shows an example of a truck brake unit use for a railway car wherein a brake cylinder unit (1) that possesses the above-described advantages has been installed. In FIG. 14, the truck brake unit (50) has been composed by attaching a brake cylinder unit (1) in an inclined horizontal direction on the upper part of the housing (51), and by attaching a brake means (52) roughly level on the lower part of the housing (51). This brake cylinder unit (1) and the brake means (52) have been provided in a protruding manner facing the same side.

Inside the housing (51), a first lever (54) that serves as the intermediate support of a shaft (53), has been built in. The tip of the rod (111) of the brake cylinder unit (1) is linked to the end of the long side (541) of this first lever (54), and the rod (521) of the brake means (52) has been supported on the short side (542) of the first lever (54) through the medium of an automatic gap adjustment mechanism (55) such that it can rotate. A brake shoe maintaining body (56) that is axially supported on the tip of the rod (521) of the brake means (52) maintains the action state shown in the figure due to the fact that the second lever (58), which takes the shaft (57) of the housing (51) as the supporting point, is linked to the shaft (59) of the brake shoe maintaining body (56).

This kind of truck brake unit (50) used for railway cars is installed in the narrow part of a truck that possesses four wheels. Owing to this, it is necessary to make the entire truck brake unit (50) small in size, and one can see that using the brake cylinder unit (1) wherein the axial direction length is minimized as shown in the figure is effective.

However, there are many kinds of embodiments of the unification of the normal-service brake means and the spring brake means, and they are not limited to an embodiment like that in FIG. 2. As disclosed in Utility Model Registration Bulletin H08-5881, it is possible to apply the above-described clutch means to a brake cylinder unit wherein the first spring of the normal-service brake means and the second spring of the spring brake means are arranged in a series, and it is possible to shorten the axial direction length of the brake cylinder unit.

According to the invention, it is possible to shorten the length of the rod direction of the brake cylinder unit, by the extent to which the amount of movement of the second piston becomes smaller, and thus miniaturization of the brake cylinder unit is made possible. In addition, since the second spring that acts on the second piston extends only slightly, it is possible to use a second spring with a linear diameter smaller than a second spring such as generates the prescribed impetus after being considerably extended.

According to the invention, it is also possible to configure the clutch means with a simple structure made up of a screw that is provided on one side of the rod or second piston, and a nut member that is provided on the other side of these such that it can rotate freely.

Additionally according to the invention, it is possible to release the spring brake easily by separating the lock means manually at the time of the action of the spring brake. According to the invention in claim 4, it is possible to cause the clutch means to act reliably by since the clutch means moves in concert with the movement of the second piston, and it links the second piston with the rod.

Further, according to the invention, it is possible to release the mating between the blade tip of the lock lever and the blade of the sleeve member, so after the spring brake has been released manually, it becomes possible to make the car travel to the depot while causing the air brake to act, even in the event that it is not possible to cause the pressure fluid to act on the second action chamber of the spring brake.

According to the invention, since it is possible to maintain the unlocked state wherein the blade tip of the lock lever and the blade of the sleeve member is released by the slide pin, it becomes possible to make the car travel to the depot while causing the air brake to act, even in the event that it is not possible to cause the pressure fluid to act on the second action chamber of the spring brake.

In the invention, since the nut member and the lock lever are composed such that they mate directly, it is possible to reduce the number of parts, and to eliminate the complex processing for forming the gearing means.

According to the invention, it is possible to maintain the unlocked state wherein the mating of the blade tip of the lock lever and the blade of the nut member is released by the slide pin, so it becomes possible to make the car travel to the depot while causing the air brake to act, even in the event that it is not possible to cause the pressure fluid to act on the second action chamber of the spring brake.

Also in the invention, it is possible to build compactly a clutch means into a brake cylinder device wherein the normal-service brake and the spring brake are united in one unit, and it is possible to shorten and maintain the axial direction length of the brake cylinder unit.

And according to the invention, it is possible to shorten the axial direction length of the brake cylinder unit wherein the normal-service brake and the spring brake are united in one unit, and it is possible to minimize the axial direction length of the brake cylinder unit, combined with the shortening of the axial direction length due to the clutch means.

It can be seen from the above description that the present invention in an alternative embodiment provide a brake cylinder unit wherein the above-mentioned clutch means is equipped with a screw that is provided on either the above-mentioned rod or the above-mentioned second piston, a nut member that screws together with this screw, and that rotates based on the relative movement between the above-mentioned rod and the above-mentioned second piston, and a stop means that stops the rotation of the above-mentioned nut member when the above-mentioned second piston begins to move towards the above-mentioned rod.

In the above-mentioned composition, when the rod of the first piston moves in the brake direction during the action of the normal-service brake, the nut member rotates, so the position of the second piston does not change. In addition, when the pressure fluid ceases to act on the second action chamber, and the second piston starts to move towards the rod, the stop means of the clutch means stops the rotation of the nut member, so the second piston and the rod move in the brake direction as one unit.

The invention in another embodiment provides a brake cylinder unit described wherein the above-mentioned stop means possesses a gearing means that moves in tandem with the above-mentioned nut member, and the rotation of the above-mentioned stop means has not been stopped by a lock means that can be freely engaged and disengaged, In the above-mentioned composition, when only the second piston moves in the brake direction while the nut member rotates, during the action of the spring brake, the gearing means of the nut member and the sleeve member mesh with one another, and the rotation of the nut member is stopped by the lock means. Since this lock means can be engaged and disengaged freely, whenever one removes the lock means during the action of the spring brake, the nut member rotates, and the rod can move in an anti-brake direction due to the impetus of the first spring, and the spring brake is released.

The brake cylinder unit described in one embodiment, provides the above-mentioned stop means arranged through the medium of an impetus means at a position that opposes the above-mentioned nut member, and is equipped with a sleeve member that slides freely in the axial direction of the above-mentioned rod and whose rotation is stopped, and a gearing means that is provided respectively on the surfaces that oppose the above-mentioned sleeve member and the above-mentioned nut member.

In the above-mentioned composition, a gearing means has been provided on the sleeve member, so it is possible to provide a lock means that can be engaged and disengaged freely for the sleeve member.

The brake cylinder unit described in yet another embodiment, provides the above-mentioned lock means formed with a blade that is provided on the outer periphery of the above-mentioned sleeve member and extends in an axial direction, and a lock lever that possesses blade tip that is mated to this blade and is impelled in the mating direction, and the axial direction length of the above-mentioned blade has been set as a length of an extent where it no longer mates with the above-mentioned blade tip, when the above-mentioned mating is undone and the above-mentioned sleeve member moves in an axial direction along with the above-mentioned second piston.

In the above-mentioned composition, when one pulls the lock lever in the direction that releases the mating in opposition to the impetus, the mating between the blade on the outer periphery of the sleeve member and the blade tip of the lock lever is undone, and the nut member and the sleeve member rotate in a meshed state, so the second piston moves to the stroke end, and the spring brake is released. When the nut member and the sleeve member move in an axial direction along with the second piston, the nut member and the sleeve member rotate along with the movement of the first piston in an axial direction, and there results a state wherein the air brake can act.

The brake cylinder unit described in a further embodiment, provides the above-mentioned lock means switched from a locked position to an unlocked position by a slide pin that is pushed by the second piston that faces the stroke end.

In the above-mentioned composition, when one releases the lock means by hand, the second piston faces the stroke end due to the impetus of the of the second spring, and the lock means ends up in the unlocked position due to the slide pin. For this reason, even if the supply of air to the second action chamber becomes non-pressurized, the nut member can rotate, so it ends up in a state where the air brake means can act due to the first piston.

The brake cylinder unit described in tan additional embodiment, provides the above-mentioned stop means having a blade that is provided on the outer periphery of the above-mentioned nut member and extends in an axial direction, and a lock lever that possesses a blade tip that mates with this blade and that is impelled in the mating direction.

In the above-mentioned composition, the rotation of the nut member, which attempts to rotate by pushing with the second piston, is stopped by the lock lever, the spring brake means acts. When this lock lever is released manually, the nut member rotates, so the second piston reaches the stroke end due to the impetus of the second spring, and the spring brake means is released.

The brake cylinder unit described in the still another embodiment, provides the above-mentioned lock lever switched from a locked position to an unlocked position by a slide pin that is pushed by the second piston that faces the stroke end.

In the above-mentioned composition, when the lock lever is released manually, the second piston faces the stroke end due to the impetus of the second spring, and the lock lever ends up in being switched to the unlocked position due to the slide pin. Owing to this, the nut member can rotate, even if the supply of air to the second action chamber becomes non-pressurized, the nut member can rotate, so it ends up in a state where the air brake means can act due to the first piston.

The brake cylinder unit described in the second embodiment, wherein the above-mentioned clutch means has been provided on the inner peripheral side of the above-mentioned second action chamber.

In the above-mentioned composition, the outer diameter of the second action chamber of the ordinary spring brake means becomes larger than the outer diameter of the first action chamber of the normal-service brake means, so the sleeve member is arranged by utilizing the space of the inner peripheral side of this second action chamber.

In the above-mentioned composition, it is possible to configure the normal-service brake and the spring brake by shortening the axial direction length, when the spring brake means and the normal-service brake means are arranged by making them overlap in a diametrical direction.

I claim:

1. A brake cylinder unit, being a brake cylinder unit with which both a normal-service brake and a spring can be operated that is equipped with (a) a normal-service brake means that possesses a first piston wherein a rod protrudes, and a first spring acts in opposition to a first action charter, and wherein the above-mentioned first piston moves in the brake direction by overcoming the impetus of the above-mentioned first spring when a pressure fluid acts on the above-mentioned first action chamber, and (b) a spring brake means that possesses a second piston wherein the above-mentioned rod passes completely through and that is provided such that it can move in the axial direction of the above-mentioned rod, and wherein a second spring acts in opposition to a second action chamber, and the above-mentioned second piston moves in the above-mentioned brake direction due to the impetus of the above-mentioned second spring when a pressure fluid ceases to act on the above-mentioned second action chamber, wherein there is provided a clutch means that links the above-mentioned rod and the above-mentioned second piston when the pressure fluid ceases to act on the above-mentioned second pressure chamber, and the above-mentioned second piston begins to move towards the above-mentioned rod wherein the above-mentioned clutch means is equipped with a screw that is provided on either the above-mentioned rod or the above-mentioned second piston, a nut member that screws together with this screw, and that rotates based on the relative movement between the above-mentioned rod and the above-mentioned second piston, and a stop means that stops the rotation of the above-mentioned nut member when the above-mentioned second piston begins to move towards the above-mentioned rod, and wherein the above-mentioned stop means possesses a gearing means that moves in tandem with the above-mentioned stop means has not been stopped by a lock means that can be freely engaged and disengaged.

2. The brake cylinder unit described in claim 1, wherein the above-mentioned stop means is arranged through the medium of an impetus means at a position that opposes the above-mentioned nut member, and is equipped with a sleeve member that slides freely in the axial direction of the above-mentioned rod and whose rotation is stopped, and a gearing means that is provided respectively on the surfaces that oppose the above-mentioned sleeve member and the above-mentioned nut member.

3. The brake cylinder unit described in claim 2, wherein the lock means is formed with a blade that is provided on the outer periphery of the sleeve member and extends in an axial direction, and a lock lever that possesses a blade tip that is mated to this blade and is impelled in the mating direction, and the axial direction length of the blade has been set as a length of an extent where it no longer mates with the blade tip, when mating is undone and the sleeve member moves in an axial direction along with the second piston.

4. The brake cylinder unit described in claim 1, wherein the above-mentioned lock means is switched from a locked position to an unlocked position by a slide pin that is pushed by the second piston that faces the stroke end.

5. The brake cylinder unit described in claim 1, wherein the above-mentioned stop means comprises a blade that is provided on the outer periphery of the above-mentioned nut member and extends in an axial direction, and a lock lever that possesses a blade tip that mates with this blade and that is impelled in the mating direction.

6. The brake cylinder unit described in claim 5, wherein the above-mentioned lock lever is switched from a locked position to an unlocked position by a slide pin that is pushed by the second piston that faces the stroke end.

7. The brake cylinder unit described in claim 1, wherein the above-mentioned clutch means has been provided on the inner peripheral side of the above-mentioned second action chatter.

8. The brake cylinder unit described in claim 1, wherein the above-mentioned first spring and the above-mentioned second spring have been arranged such that they overlap in the diametrical direction.

9. The brake cylinder unit described in claim 1, wherein the above-mentioned first spring and the above-mentioned second spring have been arranged such that they overlap in the diametrical direction.

10. The brake cylinder unit described in claim 1, wherein the above-mentioned first spring and the above-mentioned second spring have been arranged such that they overlap in the diametrical direction.

11. The brake cylinder unit described in claim 2, wherein the above-mentioned first spring and the above-mentioned second spring have been arranged such that they overlap in the diametrical direction.

12. The brake cylinder unit described in claim 3, wherein the above-mentioned first spring and the above-mentioned second spring have been arranged such that they overlap in the diametrical direction.

13. The brake cylinder unit described in claim 4, wherein the above-mentioned first spring and the above-mentioned second spring have been arranged such that they overlap in the diametrical direction.

14. The brake cylinder unit described in claim 5, wherein the above-mentioned first spring and the above-mentioned second spring have been arranged such that they overlap in the diametrical direction.

15. The brake cylinder unit described in claim 6, wherein the above-mentioned first spring and the above-mentioned second spring have been arranged such that they overlap in the diametrical direction.

16. The brake cylinder unit described in claim 7, wherein the above-mentioned first spring and the above-mentioned second spring have been arranged such that they overlap in the diametrical direction.

* * * * *